US011617996B2

(12) United States Patent
Bicker

(10) Patent No.: US 11,617,996 B2
(45) Date of Patent: Apr. 4, 2023

(54) DYNAMIC MIXER, AUTOMATIC MIXING UNIT AND METHOD OF INSTALLING AND DRIVING A DYNAMIC MIXER

(71) Applicant: Sulzer Mixpac AG, Haag (CH)

(72) Inventor: Rene Bicker, Haag (CH)

(73) Assignee: MEDMIX SWITZERLAND AG, Haag (CH)

( * ) Notice: Subject to any disclaimer, the term of this patent is extended or adjusted under 35 U.S.C. 154(b) by 534 days.

(21) Appl. No.: 16/643,256

(22) PCT Filed: Aug. 30, 2018

(86) PCT No.: PCT/EP2018/073331

§ 371 (c)(1), (2) Date: Feb. 28, 2020

(87) PCT Pub. No.: WO2019/043092

PCT Pub. Date: Mar. 7, 2019

(65) Prior Publication Data

US 2020/0254404 A1 Aug. 13, 2020

(30) Foreign Application Priority Data

Aug. 31, 2017 (EP) .................................... 17188867

(51) Int. Cl.
*B01F 7/00* (2006.01)
*B01F 13/00* (2006.01)
(Continued)

(52) U.S. Cl.
CPC ........ *B01F 27/213* (2022.01); *B01F 27/1125* (2022.01); *B01F 33/50112* (2022.01);
(Continued)

(58) Field of Classification Search
CPC .............. F16D 2001/102; B01F 27/213; B01F 2101/19
See application file for complete search history.

(56) References Cited

U.S. PATENT DOCUMENTS 3,584,667 A 6/1971 Reiland
4,512,220 A 4/1985 Barnhill, III
(Continued)

FOREIGN PATENT DOCUMENTS

EP 1825924 B1 11/2008
GB 1194211 A 6/1970
WO 2011031440 A1 3/2011

OTHER PUBLICATIONS

International Search Report and Written Opinion dated Nov. 20, 2018 in corresponding International Patent Application No. PCT/EP2018/073331, filed Aug. 30, 2018.

*Primary Examiner* — Elizabeth Insler
(74) *Attorney, Agent, or Firm* — Global IP Counselors, LLP

(57) ABSTRACT

A dynamic mixer for mixing a multi-component material includes a mixing rotor capable of being rotated about an axis of rotation, the mixing rotor having a coupling socket configured at an end thereof. The coupling socket has a reception space configured to receive at least a part of a polygonal shaped coupling plug of a drive shaft to transfer torque from the drive shaft to the mixing rotor. The reception space has an inner length in the direction of the axis of rotation and has an inner surface extending over the inner length and surrounding the axis of rotation.

32 Claims, 4 Drawing Sheets

(51) Int. Cl.

| | |
|---|---|
| ***B01F 15/02*** | (2006.01) |
| ***B01F 27/213*** | (2022.01) |
| ***B01F 27/1125*** | (2022.01) |
| ***B01F 33/501*** | (2022.01) |
| ***B01F 35/71*** | (2022.01) |
| *B01F 101/19* | (2022.01) |
| *B01F 101/00* | (2022.01) |

(52) U.S. Cl.
CPC ...... *B01F 35/7174* (2022.01); *B01F 2101/19* (2022.01); *B01F 2101/2305* (2022.01); *B01F 2215/0431* (2013.01)

(56) References Cited

U.S. PATENT DOCUMENTS

| | | | | |
|---|---|---|---|---|
| 5,284,073 | A | 2/1994 | Wright et al. | |
| 5,904,076 | A | 5/1999 | Siwy | |
| 6,629,774 | B1 | 10/2003 | Gruendeman | |
| 7,331,744 | B2 | 2/2008 | Schultz | |
| 8,371,744 | B2 * | 2/2013 | Walter .................... | F16D 1/101<br>366/331 |
| 2005/0155467 | A1 | 7/2005 | Schultz | |
| 2012/0196247 | A1 | 8/2012 | Bugnard et al. | |
| 2013/0277390 | A1 | 10/2013 | Buck et al. | |

* cited by examiner

A,A'
5
10
15
16
11
25
6,6'
26
8'
8
13,13'
24
9
7
7'
14,14',14"
4,4'
3
2
M'
M
20
1
20'
18'
18
19'
19
17
12

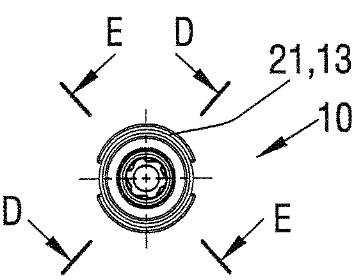
Fig.4A
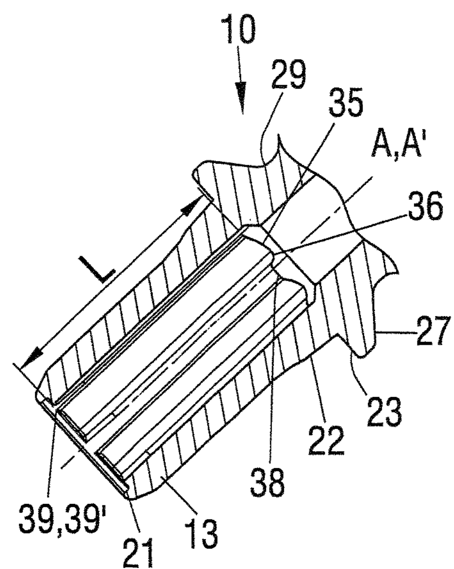
Fig.4B
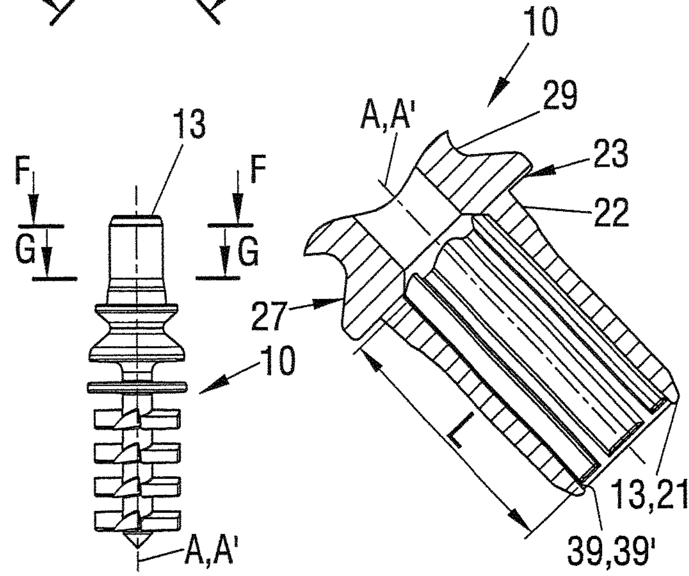
Fig.4D
Fig.4C
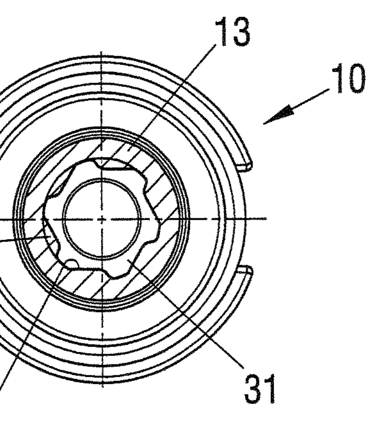
Fig.4E
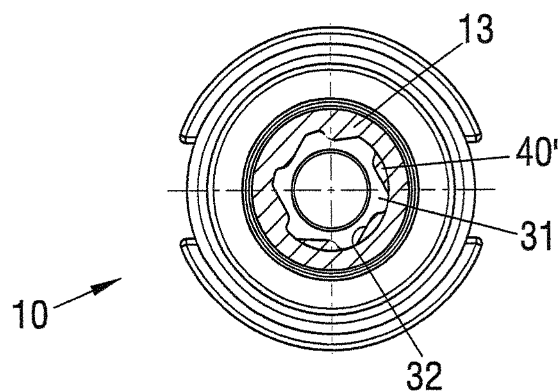
Fig.4F

DYNAMIC MIXER, AUTOMATIC MIXING UNIT AND METHOD OF INSTALLING AND DRIVING A DYNAMIC MIXER

CROSS-REFERENCE TO RELATED APPLICATION

This application is a U.S. National Stage application of International Application No. PCT/EP2018/073331, filed Aug. 30, 2018, which claims priority to European Patent Application No. 17188867.0, filed Aug. 31, 2017, the contents of each of which are hereby incorporated herein by reference.

BACKGROUND

Field of the Invention

The present invention relates to a dynamic mixer for mixing a multi-component material, the dynamic mixer generally comprises a mixing rotor that can be rotated about an axis of rotation, the mixing rotor having a coupling socket configured at an end thereof, wherein the coupling socket has a reception space configured to receive at least a part of a polygonal shaped coupling plug of a drive shaft in order to transfer torque from the drive shaft to the mixing rotor, wherein the reception space has an inner length in the direction of the axis of rotation and has an inner surface extending over the inner length and surrounding the axis of rotation. The invention further relates to an automatic mixing unit and to a method of installing and driving a dynamic mixer of the automatic mixing unit.

Background Information

Dynamic mixers are used in a plethora of applications where a precise mixing of multi-component materials is required. For example, in the dental field, e.g. two-component dental impression material is mixed using a dynamic mixer in a dental surgery. The two-component dental impression material typically comprises a binder as one component and a hardener as a further component. On sufficiently mixing the correct ratio of the two-component material over the required path length of the dynamic mixer, the best mixing results are achieved with the two-component material.

For the mixing, the dynamic mixers are placed at an automatic mixing unit. The automatic mixing unit comprises a receptacle for the cartridges of multi-component material, a discharge mechanism for the multi-component material and a drive shaft that is configured to cooperate with the dynamic mixer and to drive the rotor of the dynamic mixer in order to effect a through mixing of the multi-component material dispensed via the automatic mixing unit.

The dynamic mixers are exchangeable parts generally of plastic. In contrast to this the drive shaft of the automatic mixing unit can be made of metal. In order to bring about a force transfer from the drive shaft to the rotor, the rotor has a coupling socket at its end that receives a coupling plug of the drive shaft. To ensure a force transfer the drive shaft has a polygonal, preferably hexagonal, outer shape.

The drive shaft of the automatic mixing unit is typically retracted on inserting a new dynamic mixer into the automatic mixing unit so that the drive shaft does not engage the coupling socket. Should the hexagonal shaped coupling socket and the hexagonal shaped coupling plug not be correctly aligned with respect to one another, it can then happen, on moving the coupling plug into a position in which it should engage the coupling socket, that the coupling plug is not inserted into the coupling socket, but rather that the coupling plug is in a position in which it merely abuts the coupling socket. This means that the dynamic mixer does not engage the drive shaft in a torque transferring manner.

SUMMARY

Depending on the design of the automatic mixing unit used with the dynamic mixer, a drive shaft thereof is operated either at a speed of 0 RPM or at a maximum of revolutions per minute (RPM). Thus, if the automatic mixing unit is automatically operated at the maximum RPM, the internal hexagonal shape of the generally plastic coupling socket cannot align correctly with the coupling plug, but is rather destroyed by the e.g. metal drive shaft and hence the rotor is not driven correctly. This means that the multi-component material is not sufficiently mixed by the rotor, so that this does not obtain its desired final properties. Alternatively the misalignment of the drive shaft relative to the rotor can cause the introduction of shear forces into the rotor if this is operated at the maximum RPM. However, the multi-component material is frequently a comparatively highly viscous fluid. The introduced shear forces can cause the rotor to snap when this contacts the highly viscous fluid and hence no mixing takes place at all by a rotating rotor once the rotor has snapped.

An exemplary prior art dynamic mixer is disclosed in WO2011/031440 A1. For this reason it is an object of the invention to provide a dynamic mixer that can be aligned better relative to the drive shaft than prior art dynamic mixers and to thereby ensure that the number of rejected dynamic mixers due to a misalignment is minimized. It is a further object of the invention to ensure that a sufficient force transfer between the drive shaft and the dynamic mixer is obtained. It is yet a further object of the invention to minimize a production cost of such dynamic mixers.

This object is satisfied by a dynamic mixer having the features described herein.

Such a dynamic mixer can comprise two or more inlets arranged at an inlet end of the dynamic mixer, a mixer outlet that is arranged at an outlet end of the dynamic mixer, with the mixer outlet being oppositely disposed of the two or more inlets, a mixing rotor that can be rotated about an axis of rotation, the axis of rotation extending between the inlet end and the outlet end, the mixing rotor having a coupling socket configured at an end thereof, wherein the coupling socket has a reception space that is suitable and optionally configured to receive at least a part of a polygonal shaped coupling plug of a drive shaft in order to preferably transfer torque from the drive shaft to the mixing rotor, wherein the reception space has an inner length in the direction of the axis of rotation and has an inner surface extending over the inner length and surrounding the axis of rotation, wherein the inner surface comprises convex part surfaces that are spaced apart from one another, with the convex part surfaces being formed by projections projecting towards the axis of rotation, and wherein a cross-section of at least some, and preferably of all, of the projections has at least substantially the same shape and size respectively has the same shape and size over at least a part of the inner length of the coupling socket.

In this connection it should be noted that the term having the same shape and size of the projections relates to projections that are generally of the same shape and size with deviations of this size and shape of up to 5%, preferably of up to 2%, being possible with respect to projections having the identical same shape and size.

It should further be noted in this connection that a projection having the same shape and size over at least a part of the inner length means that the projection has the same height and length and optionally also the same width at the same height over said part of the inner length.

The dynamic mixer presented herein can be used with a variety of third party automatic mixing units. This is because the invention is based on the recognition that the drive shaft of an automatic mixing unit generally only rotates in one direction of rotation and hence that the coupling socket does not have to bring about a force transfer in both directions of rotation for a mixing to take place. The mixing rotor only has to be rotated in the direction of rotation defined by the direction of rotation of the automatic mixing unit.

By providing convex part surfaces, i.e. projections, at the internal surface of the coupling socket the force transfer can be brought about via the convex part surfaces, whereas a space made available between the convex part surfaces, i.e. a space which would normally be filed with a planar flank of the hexagonal shaped socket used to rotate the coupling socket in the opposite direction of rotation can now be used as a pivot space by which the coupling socket can pivot relative to the e.g. hexagonal shaped coupling plug, so that misalignments can be corrected for, before the actual operation of the automatic mixing unit.

Moreover, an improved error tolerance on affixing the dynamic mixer to the drive shaft is achieved. This leads to an increase in the application safety, as generally a higher level of quality of the obtained mixing results is thereby achieved.

It should also be noted that the specific design of the outer shape of the mixing rotor can remain unchanged, so that the formation of a new interior shape of the coupling socket means that only a part of a core used to form the dynamic mixers has to be replaced, with the outer shape of the mixing rotors of the dynamic mixers still being able to be produced in the previously used molds. This extremely minimizes the new cost of production of the apparatus used to form such mixing rotors, as substantial parts of the previously used apparatus can still be used.

Preferably the projections forming the convex part surfaces are arranged in respective rows extending in parallel to the axis of rotation and over the length of the inner surface. Forming the convex part surfaces in rows means that the convex part surfaces have the same shape and size at various positions along the length of the coupling socket and that they extend in parallel to one another over the inner length. This is beneficial on forming part of a core of an injection molding tool, as components having an at least constant size and shape are more easily and cost effectively produced at a desired quality than filigree components with varying shape and/or size.

Moreover, in contrast to dynamic mixers, where insertion aids are formed in the introductory portion of the coupling socket—with the insertion aids not being designed for a force transfer—the present invention enables a force transfer from the drive shaft to the mixing rotor to take place over effectively the complete inner length of the coupling socket. It should also be noted that the fact that no insertion aids are used, means that filigree components that are prone to damage are not required. This also decreases the cost of the dynamic mixers presented herein in comparison to those that have an insertion aid present in the introductory portion of the coupling socket.

It should be noted that at least one, and preferably only one, projection can be present per row. This makes the injection molding tool used for forming the mixing rotor even more simple and hence the mixing rotor more cost effective to produce. Moreover, forming one convex part surface that extends over the inner length means that a force transfer is brought about over the entire length of the coupling socket.

Preferably a number of the rows of the projections and hence of the convex part surfaces corresponds to a number of side surfaces of the coupling plug having the outer polygonal shape. In this way each convex part surface can be used for a torque transfer.

It is preferred if each of the convex part surfaces comprises an at least substantially curved surface. Curved surfaces are simple and cost effective to produce in an injection molding process and facilitate a release of the mold following an injection molding process.

Preferably each of the convex part surfaces comprises an at least substantially planar surface. Such planar surfaces enable an intimate contact with the side surfaces of e.g. a regular hexagon that is the shape of an end of a drive shaft used to drive the mixing rotor. Such an intimate contact is required to ensure an as efficient torque transfer as possible.

Advantageously each at least substantially planar surface, preferably directly, adjoins the curved surface of the convex part surface. In this way a smooth convex part surface can be formed.

It is preferred if the convex part surfaces are shaped to permit the transfer of torque to the mixing rotor in a desired direction of rotation of the mixing rotor, with the at least substantially planar surface being in contact with a part of a planar surface of the polygonal shaped coupling plug of the drive shaft in the desired direction of rotation of the rotor when the coupling socket is rotated in the desired direction of rotation.

Preferably a further part of a planar surface of the polygonal shaped coupling plug of the drive shaft is in contact with a part of a further convex part surface, with the part not being the at least substantially planar surface, in a direction of rotation of the mixing rotor opposite to the desired direction of rotation, when the coupling socket is rotated in a direction of rotation opposite to the desired direction of rotation, with the further part of the planar surface being arranged directly adjacent to said part of the planar surface at the other side of an apex of the coupling plug. Thus, the coupling socket is configured to only come into engagement with a part of the planar surface of the coupling plug. In contrast to this prior art coupling sockets are configured to engage the complete planar surface of the coupling plug.

The space present between adjacent convex part surfaces preferably forms a region in which the apex of the polygonal shaped coupling plug of the drive shaft can rotate between a position in which said part of the planar surface contacts the at least substantially planar surface of one convex part surface and a position in which the further part of the planar surface contacts the part of the further convex part surface that is not the at least substantially planar surface of a directly adjacent convex part surface on an introduction of the coupling plug into the reception space.

This space or recess increases the space available for the insertion of the coupling plug of the drive shaft into the coupling socket, with the area available for a force transfer remaining approximately the same to that of a hexagonal shape.

It has namely been found that on reducing the size of the planar surface of the convex part surface, e.g. by shortening the flank, a free space results in which the drive shaft can rotate to and fro within the coupling socket. The area made available for a force transfer is indeed slightly smaller, however is still sufficient in order to thoroughly mix the components to be dispensed from the multicomponent cartridge. However, this dynamic mixer now has a free space in which the mixing rotor can rotate relative to the drive shaft in order to correct any misalignments relative to the drive shaft and hence to accept the drive shaft in an aligned manner.

It should be noted that the desired direction of rotation of the mixing rotor is preferably selected as the counter-clockwise direction of rotation of the mixing rotor in the dental field. This ensures an intimate mixing of e.g. dental impression materials.

Preferably the projections of the convex part surfaces have at least substantially the same shape and size in cross-section over 20% to 90% of the total inner length of the coupling socket and especially over at least 90% of the total inner length of the coupling socket and most especially over at least substantially the total inner length of the coupling socket. Such convex part surfaces are simple to make, as no complex cores of the injection molded tool are required. Moreover, forming a convex part surface that extends over a substantial part of the inner length of the coupling socket means that this convex part surface is available for a uniform force transfer over the substantial part of the inner length.

Advantageously the dynamic mixer further comprises concave part surfaces, with the concave part surfaces being arranged between adjacent convex part surfaces. The concave part surfaces form advantageous free spaces in which a relative rotation of the coupling socket relative to the coupling plug can be permitted. In this connection it should be noted that the free spaces could also be formed by a planar surface or even a slightly convex part surface.

Preferably the concave part surfaces have at least substantially the same shape and size over at least a part of the inner length of the coupling socket. The free space is hence available over at least a part and preferably over the total inner length and hence the coupling socket can be rotated relative to the coupling plug over the complete inner length.

It is preferred if the concave part surfaces and the convex part surfaces are arranged in respective rows extending in parallel to the axis of rotation and over the length of the inner surface, with the rows of concave part surfaces not comprising any convex part surfaces and with the rows of convex part surfaces optionally not comprising any concave part surfaces. By not providing any convex part surfaces in the rows of concave part surfaces no abutments are present in the rows of concave part surfaces that may hinder the introduction of the coupling plug.

Preferably each of the concave part surfaces comprises a part cylindrical surface. Such cylindrically shaped surfaces are comparatively simple to manufacture and make available more free space in which a relative movement between the coupling plug and the coupling socket can take place in contrast to e.g. a planar surface or even a slightly convex part surface.

Advantageously each of the part cylindrical surfaces is aligned at a common circle, with in particular the projections also being aligned as projecting from the common circle. In this way the concave and convex part surfaces are aligned with respect to a common reference location that is the common circle.

It is preferred if a transition from a respective concave part surface to a respective convex part surface is formed by a curved transition surface. Such a curved transition surfaces ensures a smooth transition from a respective convex part surface to a respective concave part surface and is moreover comparatively simple to manufacture.

Advantageously a radius of curvature of each curved transition surface is less than a radius of curvature of the curved surface of the convex part surface and is less than a radius of curvature of each of the part cylindrical surfaces. In this way as much free space as possible is made available in which the apex of a polygonal shaped coupling plug can move on insertion into the coupling socket.

Preferably a radius of curvature of a respective curved transition surface is selected in the range of 0.15 to 0.45 mm, especially in the range of 0.2 to 0.4 mm and most preferably amounts to at least substantially 0.3 mm; and/or wherein a radius of curvature of a respective curved surface of the convex part surface is selected in the range of 0.45 mm to 0.75 mm, especially in the range of 0.5 to 0.7 mm and most preferably amounts to at least substantially 0.6 mm; and/or wherein a radius of curvature of a respective part cylindrical surface is selected in the range of 2 to 4 mm, especially in the range of 2.5 to 3.5 mm and most preferably amounts to at least substantially 2.97 mm; and/or wherein a width of the at least substantially planar surface transverse to the axis of rotation between a transition from one convex part surface to one concave part surface and the next transition from the concave part surface to the adjacent convex part surface is selected in the range of 0.8 to 3 mm, especially in the range of 1 mm to 1.7 mm, especially have a width that amounts to at least substantially 1.38 mm; wherein the length of at least one of the convex part surfaces, the concave part surfaces and the at least substantially planar surface of a convex part surface in parallel to the axis of rotation is selected in the range of 3 to 20 mm, preferably in the range of 8 to 18 mm and especially in the range of 10 to 15 mm; and/or wherein a maximum internal diameter of the inner surface is selected in the range of 4.5 to 7.5 mm, especially in the range of 5 to 7 mm and most preferably amounts to at least substantially 5.9 to 6.1 mm; and/or wherein the inner length of the socket is selected in the range of 5 to 20 mm, preferably in the range of 8 to 18 mm and especially in the range of 11 to 15 mm; and/or wherein a radius of the common circle is selected in the range of 3 to 10 mm, especially in the range of 4 to 8 mm and preferably amounts to at least substantially 6 mm; and/or wherein a spacing between adjacent transitions is selected in the range of 1 to 3 mm, especially in the range of 1.3 mm to 2 mm and preferably amounts to at least substantially 1.77 mm. Such dimensions illustrate preferred design parameters of the coupling socket in accordance with the present invention.

According to a further aspect of the present invention this relates to an automatic mixing unit. Such an automatic mixing unit comprises:

a cartridge receptacle for a multi-component cartridge, a connection region for a dynamic mixer, the dynamic mixer having a mixing rotor; and a drive shaft for driving the mixing rotor of the dynamic mixer, wherein the mixing rotor comprises a coupling element and the drive shaft comprises a coupling member; wherein one of the coupling member and the coupling element has a coupling plug and the other one of the coupling member and the coupling element has a coupling socket; wherein the coupling plug has an outer polygonal shape, wherein the coupling socket, preferably formed in accordance with the teaching presented herein, comprises a reception space that is configured to receive at least a part of the polygonal shaped coupling plug and wherein the reception space has an inner length in the direction of the axis of rotation and an inner surface extending over the inner length and surrounding the axis of rotation, wherein the inner surface is formed by a series of convex part surfaces spaced apart from one another, with the convex part surfaces being formed by projections projecting towards the axis of rotation, and with a cross-section of at least some, and preferably of all, of the projections having at least substantially the same shape and size over at least a part of the inner length of the coupling socket, with the automatic mixing unit optionally further comprising the multi-component cartridge, the multi-component cartridge being filled with respective multi-component materials.

The advantages discussed in the foregoing in connection with the dynamic mixer likewise hold true for the automatic mixing unit.

According to a further aspect the present invention relates to a method of installing and driving a dynamic mixer of the automatic mixing unit in accordance with the teaching presented herein. On use of this method at least part of the coupling plug is inserted into the reception space of the coupling socket; and the mixing rotor is subsequently rotated in a desired direction of rotation by the drive shaft of the automatic mixing unit while the coupling plug engages the projections of the coupling socket.

Further advantages and design features of the invention are discussed in the following in the specific description and the claims.

BRIEF DESCRIPTION OF THE DRAWINGS

The invention will be explained in more detail hereinafter with reference to the drawings.

FIGS. 4A-4F are various views of the mixing rotor of FIG. 2; and

DETAILED DESCRIPTION OF EMBODIMENTS

Figure 1:
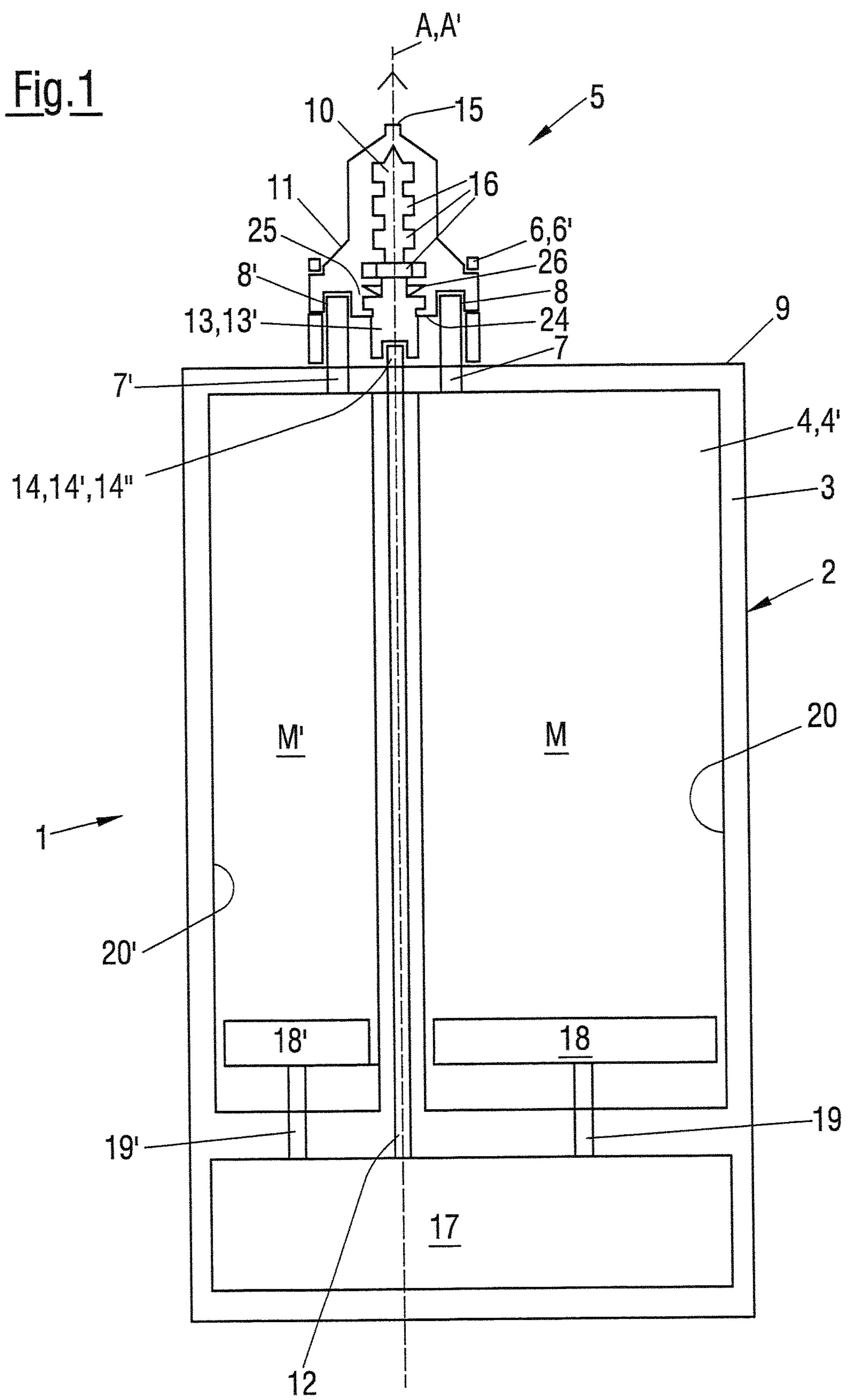
FIG. 1 is a schematic sectional view of an automatic mixing unit.

In the following the same reference numerals will be used for parts having the same or equivalent function. Any statements made having regard to the direction of a component are made relative to the position shown in the drawing and can naturally vary in the actual position of application.

FIG. 1 shows a schematic sectional view of an automatic mixing unit (mixer) 1 as is used e.g. in dental surgeries to dispense multi-component materials then used to form e.g. dental imprints or molds of a patients' teeth. The automatic mixing unit 1 comprises a housing 2 having a cartridge receptacle 3 for a multicomponent cartridge 4, in the present instance a two-component cartridge 4'. A dynamic mixer 5 is connected to the two-component cartridge 4' in a connection region 6 present in the region of the outlets 7, 7' from the two-component cartridge 4' and in the region of the inlets 8, 8' of the dynamic mixer 5 at an end 9 of the housing 2.

In the present example the connection region 6 comprises a latch 6' which releasably fixes the dynamic mixer 5 to the two-component cartridge 4'.

Depending on the design of the two-component cartridge 4', the latch 6' can be present at the two-component cartridge 4', as is the case in the present embodiment. Alternatively the latch 6' can be a part of the housing 2 per se (not shown). Also other attaching means (or connectors) other than a latch 6' can be used to attach the dynamic mixer 5 to the two-component cartridge 4'. For example, a retainer nut or the like can hold the dynamic mixer 5 in place at the multi-component cartridge 4.

The dynamic mixer 5 comprises a mixing rotor 10 arranged within a housing 11 of the dynamic mixer 5. The mixing rotor 10 is driven by a drive shaft 12 of the automatic mixing unit 1. On driving the mixing rotor 10 and the drive shaft 12, these both rotate about an axis of rotation A. In this connection it should be noted that the dynamic mixer 5 is frequently also referred to as a mixing tip.

In the dental field the desired direction of rotation of the mixing rotor 10 and hence of the drive shaft 12 is the counter clockwise direction of rotation. In other fields the desired direction of rotation is the clockwise direction of rotation. The design of the mixing rotor 10 discussed in the following in detail can be adapted for both directions of rotation of the mixing rotor 10.

In order to couple the drive shaft 12 to the mixing rotor 10, the mixing rotor 10 comprises a coupling socket 13 also known as a coupling element 13' into which a coupling end 14 of the drive shaft 12 is inserted. The coupling end 14 of the drive shaft is often also referred to as a coupling plug 14' also known as a coupling member 14". It should be noted that in the present example the coupling plug 14' has a polygonal outer shape, namely that of a regular hexagon.

The drawing shown in FIG. 1 illustrates the coupling element 13' to be present at the mixing rotor 10 and the coupling member 14" to be present at the drive shaft 12. It should be noted in this connection that designs are possible in which the coupling element 13', that is the coupling socket 13, is present at the drive shaft 12 and consequently the coupling member 14", that is the coupling plug 14', is present at the mixing rotor 10.

The mixing rotor 10 is driven to mix components M, M' originally stored in the two-component cartridge 4' within the dynamic mixer 5 and to subsequently dispense these via the mixer outlet 15. In order to mix the components M, M', the mixing rotor 10 comprises a plurality of mixing vanes 16 that are configured and arranged about the axis of rotation A along the length of the mixing rotor 10.

The automatic mixing unit 1 comprises a drive unit 17 that is configured to drive the drive shaft 12 and thereby the mixing rotor 10. The drive unit 17 is further configured to drive respective pistons 18, 18' via piston drive shafts 19, 19' in order to urge the material M, M' stored in the two-component cartridge 4' towards the outlets 7, 7' and thereby into the dynamic mixer 5.

When the automatic mixing unit 1 is activated, the pistons 18, 18' move along the walls 20, 20' of the two-component cartridge 4' in a direction towards the outlets 7, 7' of the two-component cartridge 4' in a longitudinal direction A' of the dynamic mixer 5 that coincides with the axis of rotation A of the mixing rotor 10.

The components M, M' are pressed out of the outlets 7, 7' of the two-component cartridge 4' and into the inlets 8, 8' arranged in a region of a bottom housing part 24 of the housing 11 of the dynamic mixer 5. The inlets 8, 8' guide the material into an antechamber 25 arranged in the region of a rotary surface 26 of the mixing rotor 10. A pre-mixing of the material takes place in the antechamber 25 in the region of the rotary surface 26.

The drive unit 17 and hence the automatic mixing unit 1 can be operated by f battery power or can be connected to a mains supply (both not shown).

In this connection it should be noted that the dynamic mixer 5 is a disposable part that can be exchanged after every use or after several uses of the automatic mixing unit 1. Likewise the multi-component cartridge 4, or at least components of the multi-component cartridge 4 is/are (a) disposable part(s) that is/are regularly exchanged.

Figure 2:
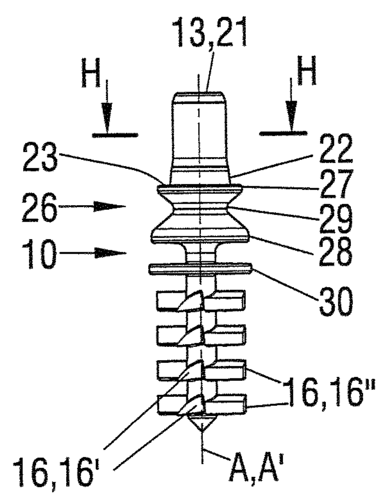
FIG. 2 is a perspective view of the mixing rotor of a dynamic mixer.

FIG. 2 shows a detailed view of the mixing rotor 10 of the dynamic mixer 5. The coupling socket 13 is present at an end 21 thereof. In order to sealingly and rotatably install the mixing rotor within the housing 11 of the dynamic mixer 5, the mixing rotor 10 is journaled within the housing 11 via a sealing surface 22 and a shoulder 23. The bottom housing part 24 of the housing 11 abuts the shoulder 23 of the mixing rotor 10 whereas the mixing rotor 10 can rotate relative to the bottom housing part 24 about the sealing surface 22.

The shoulder 23 is arranged upstream of the sealing surface 22 in the longitudinal direction A' of the mixing rotor 10 and forms a boundary of the journaled mixing rotor 10 with regard to the components M, M'.

The mixing rotor 10 further comprises the rotary surface 26 which forms an inner boundary of the antechamber 25. The rotary surface 26 is composed of a first conical surface part 27 and a second conical surface part 28. An indentation 29 is located between the first conical surface part 27 and the second conical surface part 28. The extent of the cross-sectional surface of the rotary surface 26 is selected in this manner to exert shear forces which are as high as possible onto the filler material which surrounds the rotary surface 26 in the operating state. The filler material that is the components M, M' supplied through the inlets 8, 8', comes into contact with the mixing rotor 10 for the first time at the rotary surface 26.

A disk element 30 is arranged upstream of the rotary surface 26 of the mixing rotor 10 in the longitudinal direction A'. This disk element 30 is provided to carry out a further pre-mixing of the components M, M' before the components M, M' come into contact with the mixing vanes 16 of the mixing rotor 10. As can be seen in the view of FIG. 2 the illustrated mixing rotor comprises first and second mixing vanes 16',16"

Figure 3:
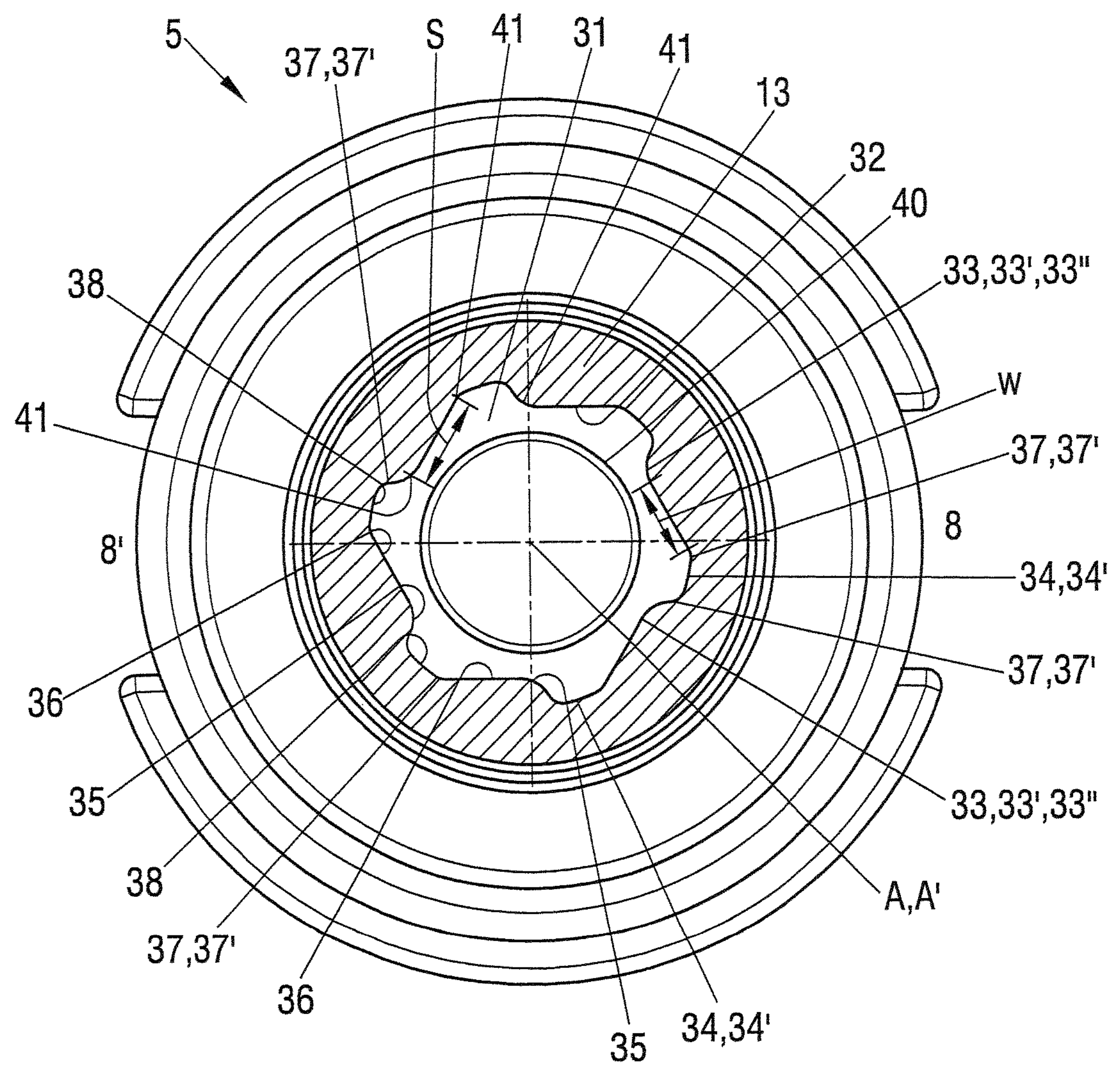
FIG. 3 is a part sectional view of the mixing rotor of FIG. 2 along the sectional line HH.

FIG. 3 shows a part sectional view of the mixing rotor 10 of FIG. 2 along the sectional line HH. The coupling socket 13 of the dynamic mixer 5 has a reception space 31 configured therein to receive at least a part of the hexagonal shaped coupling plug 14' of the drive shaft 12 (see e.g. FIG. 5D in this regard). This coupling socket 13 is provided in order to transfer torque from the drive shaft 12 to the mixing rotor 10 of the dynamic mixer 5 on operation of the automatic mixing unit 1.

The reception space 31 has an inner length L (see e.g. FIGS. 4B and 4C) in the direction of the axis of rotation A and has an inner surface 32 extending over the inner length L and surrounding the axis of rotation A. The inner surface 32 comprises convex part surfaces 33 that are spaced apart from one another. The convex part surfaces 33 have projections 33" that project towards the axis of rotation A. The projections 33" of the convex part surfaces 33 are configured to have at least substantially the same shape and size in cross-section over at least a part of the inner length L of the coupling socket 13, with the cross-sections being visible in plane perpendicular to the axis of rotation A.

The inner surface 32 further comprises concave part surfaces 34 which are arranged in the spacing between adjacent convex part surfaces 33. In fact the concave part surfaces 34 and the convex part surfaces 33, respectively the projections 33", are arranged in respective rows 33',34' extending in parallel to the axis of rotation A and over the length L of the inner surface 32 of the coupling socket 13. It is to be noted that the rows 34' of concave part surfaces 34 do not comprise any convex part surfaces 33'.

In the drawings shown herein the rows 33' of projections 33" respectively of convex part surfaces 33 also do not comprise any concave part surfaces 34. It is however feasible, that the rows 33' of projections 33" each comprise two or more projections 33" that are spaced from one another in each row 33' and that the spaces between the two or more projections 33" are formed by bridging surfaces (not shown) that could be formed by a concave part surface or the like. In this connection it should be noted that the two or more projections 33" would then be arranged one after the other in the longitudinal direction A'.

The number of rows 33',34' of the convex and concave part surfaces 33, 34 corresponds to a number of side surfaces and apexes of the polygonal shaped coupling plug 14' of the drive shaft 12. In the present instance the drive shaft 12 has a hexagonal shaped coupling plug 14' and hence there are six convex part surfaces 33 and six concave part surfaces 34 that interact with six planar side surfaces and six apexes of the coupling plug 14'.

Each of the convex part surfaces 33 comprises an at least substantially curved surface 35 that directly adjoins an at least substantially planar surface 36. A transition 37 between adjacent convex part surfaces 33 and concave part surfaces 34 is formed by a curved transition surface 37'. In this regard each of the concave part surfaces 34 comprises a part cylindrical surface 38.

Hence the inner surface 32 is formed by six part cylindrical surfaces 38 which merge into six convex part surfaces 33 via respective curved transition surfaces 37' with each convex part surface 33 comprising a respective at least substantially curved surface 35 that directly adjoins an at least substantially planar surface 36.

The position of the at least substantially planar surface 36 relative to the part cylindrical surface 38 defines the desired direction of rotation of the mixing rotor 10. In the present view each at least substantially planar surface 36 is arranged at the left hand side of a part cylindrical surface 38, for this reason the mixing rotor 10 can be rotated more easily towards the left about the axis of rotation A, i.e. in the counter-clockwise direction.

Figure 5A:
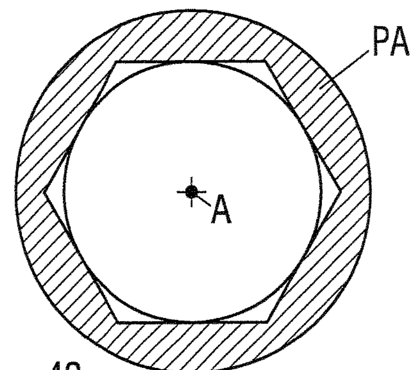
FIGS. 5A-5D are various sectional views of different designs of coupling sockets of mixing rotors.
Figure 5B:
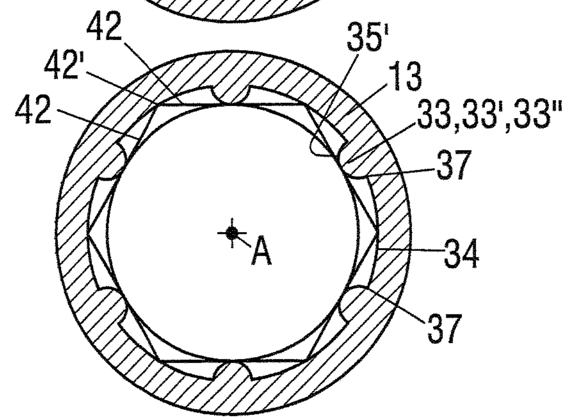
Figure 5C:
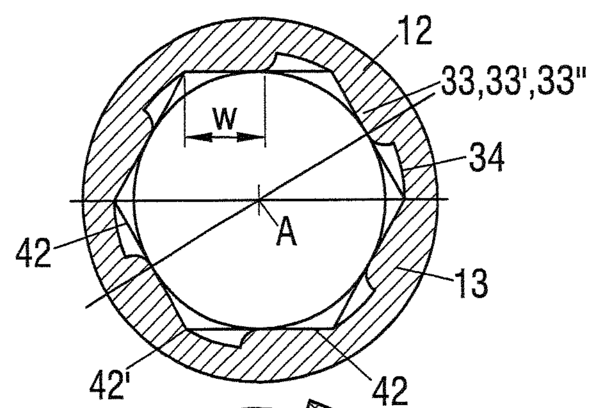
Figure 5D:
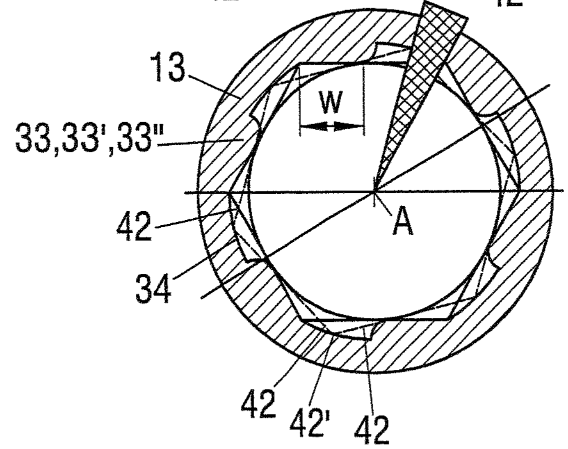

In order to form a mixing rotor 10 whose desired direction of rotation is in the clockwise direction, each at least substantially planar surface 36 should be arranged at the right hand side of a part cylindrical surface 38 (see e.g. FIGS. 5C and 5D in this regard).

The circle 40 indicated in the reception space 31 is indicative of the mixing rotor 10 that adjoins the coupling socket 13 behind the reception space 31.

It should further be noted that a radius of curvature of a respective curved surface 35 of the convex part surface 33 amounts to at least substantially 0.6 mm. Depending on the specific design in question a radius of curvature of a respective curved surface 35 of the convex part surface 33 can be selected in the range of 0.45 mm to 0.75 mm, especially in the range of 0.5 to 0.7 mm.

It should further be noted that a width w of the at least substantially planar surface 36 transverse to the axis of rotation A between a transition 37 from one convex part surface 33 to one concave part surface 34 and the next transition 37 from the concave part surface 34 to the adjacent convex part surface 33 is selected in the range of 0.8 to 3 mm, especially in the range of 1 to 1.7 mm. In the present example the width w is selected as at least substantially 1.38 mm.

It should also be noted that a spacing s between adjacent transitions 37 is selected in the range of 1 to 3 mm, especially in the range of 1.3 mm to 2 mm and preferably amounts to at least substantially 1.77 mm. In this connection the spacing s is defined as the spacing s between a respective geometric center 41 of each transition 37.

In this connection it should be noted that a radius of curvature of a respective curved transition surface 37' amounts to at least substantially 0.3 mm. It should further be noted that depending on the design of the dynamic mixer 5 the radius of curvature of a respective curved transition surface 37' can be selected in the range of 0.15 to 0.45 mm and especially in the range of 0.2 to 0.4 mm.

It should also be noted that a radius of curvature of a respective part cylindrical surface 38 of the concave part surface 34 amounts to at least substantially 2.97 mm. Depending on the specific design the radius of curvature of respective part cylindrical surface 38 of the concave part surface 34 can be selected in the range of 2 to 4 mm, especially in the range of 2.5 to 3.5 mm.

It should further be noted that the length of at least one of the convex part surfaces 33, the concave part surfaces 34 and the at least substantially planar surface 36 of the convex part surface 33 in parallel to the axis of rotation A is selected in the range of 3 to 20 mm, preferably in the range of 8 to 18 mm and especially in the range of 10 to 15 mm.

It should further be noted that a maximum internal diameter of the inner surface 32 is selected in the range of 4.5 to 7.5 mm, especially in the range of 5 to 7 mm and most preferably amounts to at least substantially 5.94 mm.

It should further be noted that the inner length L of the coupling socket 13 is selected in the range of 5 to 20 mm, preferably in the range of 8 to 18 mm and especially in the range of 11 to 15 mm.

FIG. 4A shows a view of the end 21 of the dynamic mixer 5 of FIG. 2. FIG. 4B shows a section along the sectional lines EE of FIG. 4A of the coupling socket 13 of the dynamic mixer 5. The coupling socket 13 has an insertion region 39 at the end 21.

The insertion region 39 has an opening 39' whose diameter is larger than the maximum internal diameter of the inner surface 32. The diameter of the opening 39' amounts to at least substantially 6.1 mm. Depending on the specific size and shape of the coupling socket 13, the diameter of the opening 39' can be selected in the range of 4.7 to 7.7 mm, especially in the range of 5.2 to 7.2 mm A depth of the insertion region in the direction of the longitudinal direction A' in the specific embodiment of FIG. 4B amounts to at least substantially 0.5 mm, depending on the specific size and shape of the coupling socket 13 this can be selected in the range of 0.3 to 0.7 mm, preferably in the range of 0.4 to 0.6 mm.

FIG. 4C shows a section along the sectional lines DD of FIG. 4A of the coupling socket 13 of the dynamic mixer 5. As can be seen from FIG. 4C each convex part surface 33 and each concave part surface 34 extends over at least 90% of the total inner length L of the coupling socket 13.

FIG. 4D shows a view of the mixing rotor 10 of FIG. 2 with sectional lines FF and GG having been drawn. These sectional lines FF and GG are placed at different positions along the length L of the inner surface 32 of the coupling socket 13 in comparison to the sectional line HH of FIG. 2.

The sectional view shown in FIG. 4E is taken along the sectional line FF of FIG. 4D, whereas the sectional view shown in FIG. 4F is taken along the sectional line GG of FIG. 4D. The cross-sections of the inner surface 32 of the coupling socket 13 shown in FIGS. 4E and 4F are identical to one another. In fact the cross-section of the inner surface 32 of the coupling socket 13 shown in FIG. 3 is also identical to those respectively shown in FIGS. 4E and 4F.

As can be seen e.g. in the section FF shown in FIG. 4E the concave part surfaces 34 are respectively aligned on a circle 40' surrounding the axis of rotation A of the mixing rotor 10. The circle 40' has a diameter of at least substantially 6 mm, i.e. the mixing rotor 10 could be rotated by e.g. an Allen wrench having an M6 size. Designs of the coupling plug are plausible in which a radius of the common circle is selected in the range of 3 to 10 mm (i.e. M3 to M10 sized coupling plug 14'), and especially in the range of 4 to 8 mm.

In this regard the projections 33" are also aligned with respect to this circle 40' and project from this circle 40' towards the axis of rotation A. Hence a shape of the inner surface 32 can be considered to be defined by the circle 40' having projections 33" projecting therefrom in the direction of the axis of rotation A.

The section shown in FIG. 4F shows that oppositely disposed planar surfaces 35 of the convex part surfaces 33 of a coupling socket 13 extend in parallel to one another. In the present instance the oppositely disposed planar surfaces 35 are spaced apart by at least substantially 4.9 mm.

The fact that the shape and size of the cross-section of the inner surface 32 of the coupling socket 13 respectively depicted in FIGS. 3, 4E and 4F does not change, highlights the fact that the projections 33" have substantially the same shape and size in cross-section over a substantial part of the length L of the inner surface 32 of the coupling socket 13.

FIGS. 5A to 5D show various sectional views of various coupling sockets PA, 13 similar to the sectional view shown in FIG. 3. FIG. 5A shows a prior art coupling socket PA which is formed by a hexagonal socket.

FIG. 5B shows a sectional view in accordance with the invention in which the convex part surfaces 33 consist of an at least substantially second type of curved surface 35', no curved transition surface 37' is present in the region of the transition 37 between the respective convex part surfaces 33 and the respective concave part surfaces 34.

The hexagonal shaped coupling plug 14' is also indicated in FIG. 5B. The coupling plug 14' is formed by a series of planar surfaces 42 that are each separated by a respective apex 42'.

The coupling sockets 13 of the mixing rotors 10 shown in the following in FIGS. 5C and 5D are configured for a right-handed direction of rotation about the axis of rotation A, i.e. in the clockwise direction of rotation, i.e. a force transfer in the clockwise direction is more efficient than in the counter-clockwise direction. In contrast to this the embodiment shown in FIG. 5B like the prior art example shown in FIG. 5A can be rotated in both directions of rotation about the axis of rotation A.

FIG. 5C shows a further sectional view in accordance with the invention. In contrast to the embodiment shown in FIG. 3 the at least substantially planar surface 36 has a longer width w. Consequently an arc length of the part cylindrical surface 38 is shorter than that of the embodiment shown in FIG. 3.

FIG. 5D shows a further sectional view in accordance with the invention. In contrast to the embodiment shown in FIG. 3 and FIG. 5C the at least substantially planar surface 36 has a shorter width w. Consequently an arc length of the part cylindrical surface 38 is longer than that of the embodiments shown in FIGS. 3 and 5C.

Automatic mixing units 1 available on the market are configured to drive the drive shaft 12 at a constant speed of rotation about the axis of rotation A. This speed of rotation does not change even following an exchange of dynamic mixers 5.

If, as is shown in FIG. 5A, the coupling socket PA has an internal shape that is formed complementary to the outer shape of the coupling plug 14' of the drive shaft, then a coupling socket PA misaligned relative to the coupling plug 14' can cause the metal coupling plug 14' to simply destroy the generally plastic internal shape of the coupling socket PA, or to drive this at a skew angle causing the mixing rotor 10 to snap.

In this connection it should be noted that the drive shaft 12 of the automatic mixing unit 1 is retracted to enable an installation of a dynamic mixer 5 at the automatic mixing unit 1. This retraction can be brought about by a mechanism (not shown) designed to move the drive shaft 12 to and fro along the longitudinal direction A' within the automatic mixing unit 1. The mechanism can comprise a spring bias or a motor.

If the coupling socket PA is now misaligned relative to the coupling plug 14' on a retracted drive shaft 12, then the coupling plug 14' is not received by the coupling socket 13, when the drive shaft 12 is then moved in the direction towards the coupling socket 13.

Moreover, as the drive shaft 12 of the automatic mixing unit 1 is frequently driven at only one speed, the likelihood that the coupling socket PA and the coupling plug 14' become aligned in such a manner that the coupling plug 14' is subsequently inserted into the coupling socket PA during use of the automatic mixing unit 1 is rather slim.

This creates the problem that either no mixing takes place or that a faulty mixing takes place. This is because the coupling plug 14' simply does not engage the coupling socket 13 in a torque transmitting manner, or because a faulty mixing takes place as a torque is transferred to the mixing rotor 10; however, due to the misalignment, the torque transferred to the mixing rotor 10 is not sufficient to drive the mixing rotor 10 such that a correct mixing of the multi-component materials M, M' takes place.

The invention shown e.g. in the cross-sections of FIGS. 3 and 5B to 5D seeks to address this problem by forming a coupling socket 13 that has an internal shape that, on the one hand, permits the torque transfer from the drive shaft 12 to the mixing rotor 10 to take place. On the other hand, that creates a respective free space in the internal shape of the coupling socket 13 between adjacent convex part surfaces 33 that permits a relative rotation of the coupling socket 13 about the coupling plug 14', so that even a misaligned coupling socket 13 can still be aligned in the desired manner relative to the coupling plug 14' even if this is driven at the constant speed of rotations without any ramping of the speed taking place on taking into operation of the automatic mixing unit 1.

As shown by a comparison of FIGS. 5C and 5D a variation in the selection of the width w of the planar surface 36 leads to a corresponding increase or decrease in the size of the concave part surface 34. The size of the concave part surface 34 defines a space available for correcting a possible misalignment of the coupling plug 14' relative to the coupling socket 13. The apex 42' of the coupling plug 14' can rotate in this space and the larger the space available is, the greater the misalignment of the mixing rotor 10 relative to the drive shaft 12 can be. However, a trade off exists in that the greater the space made available for the apex 42' in the region of the concave part surface 34 is, the smaller a contact surface between the at least substantially planer surface 36 of the coupling socket 13 and a planar surface 42 of the hexagonal shaped coupling plug 14' is. This planar surface 36 defines the area available for a torque transfer between the drive shaft 12 and the coupling socket 13 and hence an efficiency of the amount of torque transferred.

In the examples shown, the free space defines an opening angle selected in the range of at least substantially 10 to 15°, in particular of 12°, with respect to the axis of rotation, i.e. the coupling socket 13 can rotate by approximately 2.7 to 4.2%, in particular 3.3% relative to the axis of rotation A and during this rotation does not engage the coupling plug 14' of the drive shaft 12.

The planar shaped surfaces 36 of all embodiments shown herein are adapted for a hexagonal shaped coupling plug 14'. Studies have shown that although the area made available for a torque transfer is indeed slightly smaller in the embodiment shown in e.g. FIG. 5D in comparison to that of FIG. 5A it is still sufficient to thoroughly mix the components M, M' to be dispensed from the two-component cartridge 4'.

On operation of the automatic mixing unit 1, the convex part surfaces 33 are shaped to permit the transfer of torque to the mixing rotor 10 in the desired direction of rotation of the mixing rotor 10. During operation the at least substantially planar surfaces 36 are only in contact with parts of the planar surfaces 42 of the coupling plug 14' in the desired direction of rotation of the rotor.

The at least substantially curved surfaces 35 are only contact with the other parts of the planar surfaces of the polygonal shaped coupling plug 14' of the drive shaft 12 in a direction of rotation opposite to the desired direction of rotation. This contact generally only takes place on inserting the coupling plug 14' into the coupling socket 13, but not during an operation of the automatic mixing unit 1, since this generally only drives the drive shaft 12 in the desired direction of rotation.

The space present between adjacent convex part surfaces 33 forms the region in which the coupling socket 13 can be rotated relative to the apex 42' on an insertion of the coupling plug 14' into the coupling socket 13 between a position in which one planar surface of the polygonal shaped coupling plug 14' contacts the at least substantially planar surface 36 of one convex part surface 33 and a position in which a further directly adjacent planar surface of the coupling plug 14' contacts a part 35" of the at least substantially curved surface 35 of a directly adjacent convex part surface 33 on an introduction of the coupling plug 14' into the reception space 31. In the example shown the part 35" is formed by the curved surface 35.

As has been shown in the foregoing the design of the complementary design of the convex and concave surfaces 33, 34 is selected in order to permit the transfer of torque to the mixing rotor 10 while the automatic mixing unit 1 is operated. At the same time the design permits misaligned coupling sockets 13 to still come into intimate engagement with the coupling plug 14' of the drive shaft 12, without running the risk of destroying the interior of the coupling socket 13 or the mixing rotor 10 as was present in the prior art coupling sockets PA.

The invention claimed is:

1. A dynamic mixer for mixing a multi-component material, the dynamic mixer comprising:

two or more inlets arranged at an inlet end of the dynamic mixer;

a mixer outlet arranged at an outlet end of the dynamic mixer, with the mixer outlet being oppositely disposed from the two or more inlets;

a mixing rotor capable of being rotated about an axis of rotation, the axis of rotation extending between the inlet end and the outlet end, the mixing rotor having a coupling socket disposed at an end thereof, the coupling socket having a reception space configured to receive at least a part of a polygonal shaped coupling plug of a drive shaft, the reception space having an inner length in a direction of the axis of rotation and an inner surface extending over an inner length and surrounding the axis of rotation, the inner surface comprising convex part surfaces that are spaced apart from one another, with the convex part surfaces being formed by projections projecting towards the axis of rotation, and a cross-section of at least some of the projections has at least substantially the same shape and size over at least a part of the inner length of the coupling socket, and each of the convex part surfaces comprising an at least substantially curved surface and an at least substantially planar surface.

2. The dynamic mixer in accordance with claim 1, wherein a cross-section of at least some of the projections has the same shape and size over at least 20% of the inner length of the coupling socket.

3. The dynamic mixer in accordance with claim 1, wherein the projections forming the convex part surfaces are arranged in respective rows extending in parallel to the axis of rotation and over the length of the inner surface.

4. The dynamic mixer in accordance with claim 3, wherein at least one projection is present per row.

5. The dynamic mixer in accordance with claim 3, wherein a number of the rows of the projections and the convex part surfaces corresponds to a number of side surfaces of the coupling plug having the outer polygonal shape capable of being received in the reception space.

6. The dynamic mixer in accordance with claim 1, wherein the at least substantially planar surface adjoins the curved surface of the convex part surface.

7. The dynamic mixer in accordance with claim 6, wherein the at least substantially planar surface directly adjoins the curved surface of the convex part surface.

8. The dynamic mixer in accordance with claim 1, wherein the convex part surfaces are configured to enable a transfer of torque to the mixing rotor in a predetermined direction of rotation of the mixing rotor, with the at least substantially planar surface being in contact with a first part of a planar surface of the polygonal shaped coupling plug of the drive shaft in the predetermined direction of rotation of the mixing rotor when the coupling socket is rotated in the desired direction of rotation a second part of a planar surface of the polygonal shaped coupling plug of the drive shaft being in contact with a part of a further convex part surface that is not the at least substantially planar surface in a direction of rotation opposite to the predetermined direction of rotation, when the coupling socket is rotated in the direction of rotation opposite to the predetermined direction of rotation, with the second part of the planar surface being arranged directly adjacent to the first part of the planar surface at the other side of an apex of the polygonal shaped coupling plug.

9. The dynamic mixer in accordance with claim 8, wherein the space between adjacent convex part surfaces forms a region in which the apex of the polygonal shaped coupling plug of the drive shaft is capable of rotating between a position in which the first part of the planar surface contacts the at least substantially planar surface of one convex part surface and a position in which the second part of the planar surface contacts the part of the further convex part surface that is not the at least substantially planar surface of a directly adjacent convex part surface on introduction of the coupling plug into the reception space.

10. The dynamic mixer in accordance with claim 9, wherein the predetermined direction of rotation is a counter-clockwise direction of rotation of the mixing rotor.

11. The dynamic mixer in accordance with claim 1, wherein the projections of the convex part surfaces have at least substantially the same shape and size in cross-section over 20% to 90% of the inner length of the coupling socket.

12. The dynamic mixer in accordance with claim 1, further comprising concave part surfaces, with the concave part surfaces being arranged between adjacent convex part surfaces, and the concave part surfaces have at least substantially the same shape and size over at least a part of the inner length of the coupling socket.

13. The dynamic mixer in accordance with claim 12, wherein the concave part surfaces have at least substantially the same shape and size over at least substantially the inner length of the coupling socket.

14. The dynamic mixer in accordance with claim 12, wherein the concave part surfaces and the convex part surfaces are arranged in respective rows extending in parallel to the axis of rotation and over the length of the inner surface, with the rows of concave part surfaces not comprising any convex part surfaces and with the rows of convex part surfaces not comprising any concave part surfaces.

15. The dynamic mixer in accordance with claim 12, wherein each of the concave part surfaces comprises a part cylindrical surface.

16. The dynamic mixer in accordance with claim 15, wherein each of the part cylindrical surfaces is aligned at a common circle, with in the projections being aligned as projecting from the common circle towards the axis of rotation.

17. The dynamic mixer in accordance with claim 16, wherein a radius of the common circle is selected in the range of 3 to 10 mm.

18. The dynamic mixer in accordance with claim 15, wherein a transition from a respective concave part surface to a respective convex part surface is formed by a curved transition surface.

19. The dynamic mixer in accordance with claim 18, wherein a radius of curvature of each curved transition surface is less than a radius of curvature of the curved surface of the convex part surface and is less than a radius of curvature of each of the part cylindrical surfaces of the concave part surface.

20. The dynamic mixer in accordance with claim 19, wherein a radius of curvature of a respective curved transition surface is selected in the range of 0.15 to 0.45 mm.

21. The dynamic mixer in accordance with claim 15, wherein a radius of curvature of a respective part cylindrical surface of the concave part surface is selected in the range of 2 to 4 mm.

22. The dynamic mixer in accordance with claim 12, wherein a width of the at least substantially planar surface transverse to the axis of rotation between a transition from one convex part surface to one concave part surface and the next transition from the concave part surface to the adjacent convex part surface is selected in the range of 0.8 to 3 mm.

23. The dynamic mixer in accordance with claim 22, wherein a spacing between adjacent transitions is selected in the range of 1 to 3 mm.

24. The dynamic mixer in accordance with claim 1, wherein a radius of curvature of a respective curved surface of the convex part surface is selected in the range of 0.45 mm to 0.75 mm.

25. The dynamic mixer in accordance with claim 1, wherein the length of at least one of the convex part surfaces, the concave part surfaces and the at least substantially planar surface of a convex part surface in parallel to the axis of rotation is selected in the range of 3 to 20 mm.

26. The dynamic mixer in accordance with claim 1, wherein a maximum internal diameter of the inner surface is selected in the range of 4.5 to 7.5 mm.

27. The dynamic mixer in accordance with claim 1, wherein the inner length of the coupling socket is selected in the range of 5 to 20 mm.

28. The dynamic mixer in accordance with claim 1, wherein the reception space is configured to receive at least a part of the polygonal shaped coupling plug of the drive shaft to transfer torque from the drive shaft to the mixing rotor.

29. The dynamic mixer in accordance with claim 1, wherein the at least some of the projections has at least substantially the same shape, height and length over at least a part of the inner length of the coupling socket.

30. An automatic mixing unit, the automatic mixing unit comprising:

a cartridge receptacle for a multi-component cartridge;

a connection region for a dynamic mixer;

the dynamic mixer having a mixing rotor extending between an inlet end and an outlet end of the dynamic mixer, two or more inlets arranged at the inlet end of the dynamic mixer, and a mixer outlet arranged at the outlet end of the dynamic mixer, with the mixer outlet being oppositely disposed of the two or more inlets; and a drive shaft configured to drive the mixing rotor of the dynamic mixer, the mixing rotor comprising a coupling element and the drive shaft comprising a coupling member, one of the coupling member and the coupling element having a coupling plug and the other one of the coupling member and the coupling element having a coupling socket, the coupling plug having an outer polygonal shape, the coupling socket comprising a reception space configured to receive at least a part of the polygonal shaped coupling plug and the reception space having an inner length in a direction of the axis of rotation and an inner surface extending over the inner length and surrounding the axis of rotation, the inner surface formed by a series of convex part surfaces spaced apart from one another, with the convex part surfaces being formed by projections projecting towards the axis of rotation, and a cross-section of at least some of the projections having at least substantially the same shape and size over at least a part of the inner length of the coupling socket, and each of the convex part surfaces comprising an at least substantially curved surface and an at least substantially planar surface.

31. The automatic mixing unit in accordance with claim 30, wherein a cross-section of at least some of the projections has the same shape and size over at least 5% of the inner length of the coupling socket.

32. A method of installing and driving the dynamic mixer of the automatic mixing unit in accordance with claim 30, the method comprising:

inserting at least part of the coupling plug into the reception space of the coupling socket; and subsequently driving the mixing rotor in a predetermined direction of rotation by the drive shaft of the automatic mixing unit while the coupling plug engages the projections of the coupling socket.

* * * * *